June 9, 1925.  
W. T. SEARS  
1,540,809  
SAFETY DEVICE FOR MILLING MACHINES  
Filed Jan. 22, 1923
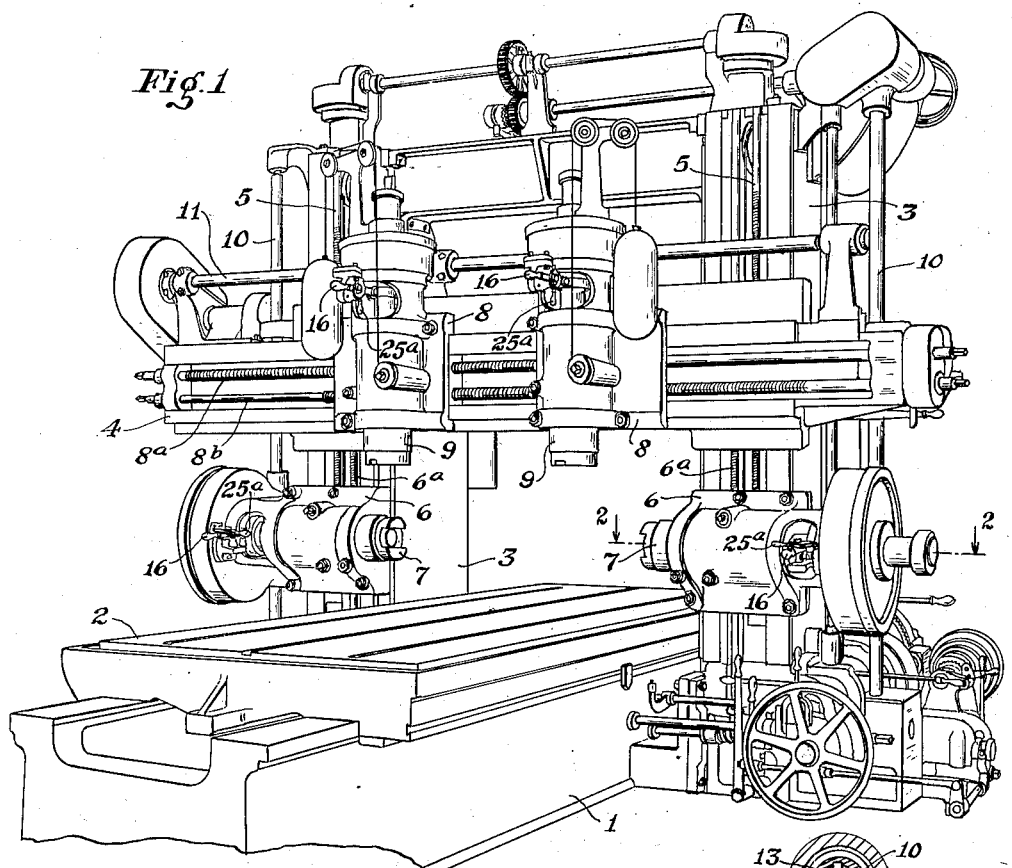
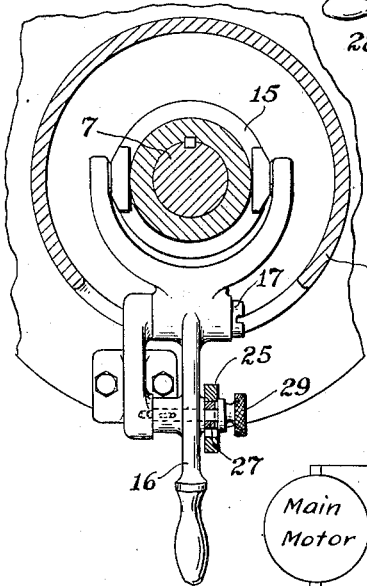
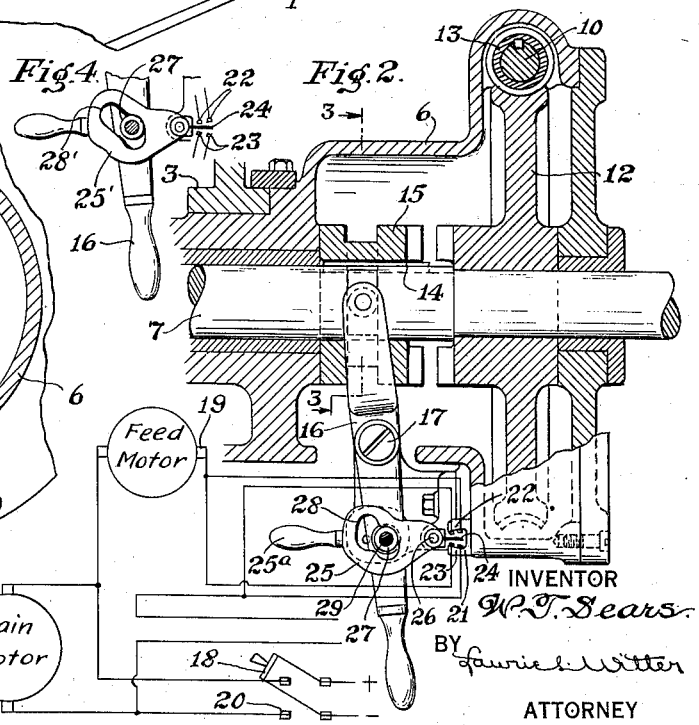
INVENTOR  
W. T. Sears  
BY  
ATTORNEY Patented June 9, 1925.

1,540,809

UNITED STATES PATENT OFFICE.

WILLARD T. SEARS, OF MONTCLAIR, NEW JERSEY, ASSIGNOR TO NILES-BEMENT-POND COMPANY, OF NEW YORK, N. Y., A CORPORATION OF NEW JERSEY.

SAFETY DEVICE FOR MILLING MACHINES.

Application filed January 22, 1923. Serial No. 614,287.

*To all whom it may concern:*

Be it known that I, WILLARD T. SEARS, a citizen of the United States, residing at Montclair, in the county of Essex and State of New Jersey, have invented certain new and useful Improvements in Safety Devices for Milling Machines, of which the following is a specification.

This invention relates particularly to milling machines of the type shown in the accompanying drawings, it being understood however that the scope of the invention is not to be limited by such illustration except as may be defined in the claims appended to this specification. In such machines a plurality of cutter spindles are provided for simultaneously operating on work carried by a work table. It is possible to use all such spindles to simultaneously mill a work piece, some work pieces however being of such shape that only certain of the spindles are adapted to operate thereon. For this reason, each spindle is ordinarily provided with means, as the clutch illustrated, whereby the same may be rendered inoperative when not being used. It will be understood that should one of the operating spindles be rendered inoperative by an inadvertent disengagement of its clutch, such spindle and its milling cutter would not be rotated and the work carried by the moving work table into engagement therewith would damage the machine. It is an object of this invention to provide means for preventing such damage.

It is an object of the invention to provide a machine of the above stated type with means for rendering one or more of the cutter spindles inoperative, a motor for feeding the work table, switch means for controlling the motor, and means cooperating with the first named means for automatically operating the switch means to stop the feed motor whenever a spindle is rendered inoperative.

A further object of the invention is to provide a machine of the type last stated with clutches whereby each cutter spindle may be individually rendered inoperative, a switch in cooperating relation with each clutch whereby disengagement of any clutch will render the feed motor inoperative, and other means cooperating with the switches whereby the feed motor may be made to operate when the clutch or clutches are in a disengaged position.

With the above and other objects in view, my invention consists in the features of construction and operation set forth in the following specification and illustrated in the accompanying drawing. In such drawing annexed hereto and forming a part of this specification, I have illustrated one embodiment of my invention but it will be understood that the invention can be otherwise embodied and that the drawing is not to be construed as defining or limiting the scope of the invention, the claims appended to this specification being relied upon for that purpose.

Referring to the figures of the drawing:

Figure 1 is a perspective view of a milling machine embodying my invention.

Fig. 2 is an enlarged fragmentary sectional view taken approximately on line 2—2 of Fig. 1 and furthermore illustrating in connection therewith a wiring diagram and motors for operating and controlling the machine.

Fig. 3 is a cross section thereof on line 3—3 of Fig. 2.

Fig. 4 is a fragmentary view illustrating a modification of the invention.

In the drawing, I have illustrated my invention in connection with a milling machine of the planer type. A base 1 has a table 2 slidable thereon between a pair of uprights 3 and beneath a cross rail 4. The cross rail may be moved vertically on the uprights by the usual screws 5. Mounted on each upright beneath the cross rail 4 is a saddle 6 carrying a horizontally disposed tool spindle 7. The saddle 6 may be adjusted vertically by screws $6^a$. Slidably mounted on the cross rail is a pair of saddles 8 carrying vertically disposed tool spindles 9. The saddles 8 may be adjusted along the rail by means of screws $8^a$ and $8^b$.

The tool spindles 7 and 9 are adapted to be rotated respectively by shafts 10 and 11 driven from the main motor illustrated in Fig. 2 in the usual or any well known manner. In Fig. 2 I have illustrated in detail the driving connection from a shaft 10 to a spindle 7, the drive from the shaft 11 to each spindle 9 being the same, need not be specifically illustrated herein. The work table 2 is adapted to be reciprocated from the feed motor illustrated in Fig. 2 by any well known means, such means and the means for rotating the spindle driving shafts from the main motor, not being themselves a part of this invention and being of any well known construction, are not illustrated in full herein.

Loosely mounted on each cutter spindle, as the spindle 7 shown in Fig. 2, is a worm wheel 12. In meshing engagement with the worm wheel is a worm 13 splined for sliding movement on the shaft 10. As above stated, the shaft 10 is driven from the main motor by any convenient or well known means. Slidably splined by means of a key 14 to each spindle is a clutch element 15 having clutch teeth thereon adapted to cooperate with adjacent teeth on the worm wheel. The clutch may be shifted into and out of engagement with the worm wheel by means of a clutch shifting lever 16 pivoted at 17.

As shown in Fig. 2, a main switch 18 controls the power to both the main motor and feed motor, the arrangement being such that the main motor is energized to rotate the spindle driving worm wheels 12 whenever the main switch 18 is closed. Interposed in the circuit of the feed motor between one terminal 19 thereof and one pole 20 of the main switch are a plurality of independent switches 21, one for each cutter spindle. One of said switches 21 is illustrated in Fig. 2.

Each switch 21 comprises two pairs of poles 22 and 23. A contact piece 24 mounted on the switch element 25 pivoted at 26 is adapted to connect either of such pairs of poles. It will be noted that pivotal movement of the element 25 in either direction to contact poles 22 or 23 is adapted to close the switch in a manner to establish the feed motor circuit. The element 25 is directly adjacent the clutch lever 16 and a roller 27 on the latter engages within a formed slot 28 in the element. As shown in Fig. 2, the clutch 15 is in its disengaged position and the switch 21 is open. Fig. 2 shows the switch 21 in the normal position when the clutch 15 is disengaged, the feed motor and work table being idle even though the main switch 18 were closed.

Assuming that all four of the spindles illustrated are to be used in a milling operation, the clutches 15 of such spindles are first closed by means of the levers 16. Each lever 16 is provided with a detent 29 for holding the same in either of its two positions. Such movement of the lever moves the roller 27 to the opposite end of the slot 28 and the operator may grasp the handle 25ª and move the element 25 in a direction to close the poles 22. When this has been done to all the switches 21, the circuit from the main switch 18 to the feed motor is completed and closing of the main switch 18 is adapted to energize both motors to rotate the spindles and feed the work table. It will now be understood that should one of the clutches 15 become disengaged either inadvertently or otherwise, so that its spindle stops rotating, such movement of the clutch lever 16 through its roller 27 will automatically move the switch 21 to the open position illustrated in Fig. 2 and thereby stop the feed motor and work table. Such mechanism therefore positively prevents damage to the machine or cutter spindles by the inadvertent disengagement of one of said spindles.

It may frequently be desired to perform milling operations which do not require the use of all four of the cutter spindles illustrated. For this reason the slot 28 is formed of such a shape that the element 25 may be moved in a direction to close the poles 23 of the switch 21 when the clutch is in the neutral position illustrated in Fig. 2. In this manner the circuit to the feed motor may be made complete even though certain of the spindles are rendered inoperative. It should be noted, however, that movement of the lever 16 from either of its extreme positions to the other position automatically opens its switch 21. The accidental or otherwise opening of a clutch 15 will therefore always operate to stop the feed motor. Furthermore, the switch 21 is normally closed through its poles 22, movement of the element 25 in a direction to close the poles 23 being unusual. The operator is therefore unlikely to close the switch 21 through its poles 23 except under the conditions just defined.

As above defined, it will be noted that the closing of either pair of poles 22 or 23 of the switch 21 requires a manual shifting of the element 25. It may be desirable to close the switch automatically with the closing of the clutch 15. In Fig. 4, I have illustrated the element 25′ as provided with a differently shaped slot 28′, such slot being so shaped that movement of the lever 16 in a direction to close the clutch 15 will automatically move the element 25′ in a direction to close the poles 22 of the switch. Otherwise, this mechanism is the same as that shown in Fig. 2.

What I claim is:

1. In a machine of the class described, the combination of a work support, a plurality of spindles adjacent thereto, power means for rotating the spindles, a motor providing a relative feeding movement between the work support and spindles, means for stopping the rotation of one of the spindles, a switch for controlling the feed motor, and means whereby the switch is automatically opened to stop the feed upon movement of the second named means to stop the rotation of the said one spindle.

2. In a machine of the class described, the combination of a work support, a plurality of cutter spindles adjacent thereto, power means for rotating the spindles, driving connections between the power means and the spindles, means for optionally rendering certain of such connections operative and inoperative, a motor for feeding the work support past the spindles, switch means for controlling the feed motor, and means whereby the switch means is automatically opened to stop the feed upon movement of the second named means to stop the rotation of any of the operative spindles.

3. In a machine of the class described, the combination of a work support, a plurality of cutter spindles adjacent thereto, power means for rotating the spindles, a motor for feeding the work support past the spindles, means for stopping the rotation of any one of the spindles individually, switch means for controlling the feed motor, and means whereby the switch means is automatically opened to stop the feed upon movement of the second named means to stop the rotation of one of the spindles.

4. In a machine of the class described, the combination of a work support, a plurality of spindles adjacent thereto, power means for rotating the spindles, a motor providing a relative feeding movement between the work support and spindles, a clutch providing a disengageable connection between the power means and one of the spindles, a switch for controlling the feed motor, and means whereby the switch is automatically opened to stop the feed upon disengaging the clutch.

5. In a machine of the class described, the combination of a work support, a plurality of cutter spindles adjacent thereto, power means for rotating the spindles, a motor for feeding the work support past the spindles, a plurality of clutches each respectively providing a disengageable connection between the power means and certain of the spindles, switch means for controlling the feed motor, and means whereby the switch means is automatically opened to stop the feed upon disengagement of one of the clutches.

6. In a machine of the class described, the combination of a work support, a plurality of cutter spindles adjacent thereto, power means for rotating the spindles, a motor for feeding the work support past the spindles, a plurality of clutches each respectively providing a disengageable connection between the power means and certain of the spindles, a plurality of switches for controlling the feed motor, and means controlled by the movement of each clutch for respectively opening one of the switches to stop the feed upon disengagement of one of the clutches.

7. In a machine of the class described, the combination of a work support, a plurality of cutter spindles adjacent thereto, power means for rotating the spindles, a motor for feeding the work support past the spindles, a plurality of clutches each respectively providing a disengageable connection between the power means and one of the spindles, switch means for controlling the feed motor, and means whereby the switch means is automatically opened to stop the feed upon disengagement of any one of a plurality of the clutches.

8. In a machine of the class described, the combination of a work support, a plurality of cutter spindles adjacent thereto, power means for rotating the spindles, a motor for feeding the work support past the spindles, a plurality of clutches each respectively providing a disengageable connection between the power means and one of the spindles, a plurality of switches for controlling the feed motor, and means controlled by the movement of each clutch for respectively opening one of the switches to stop the feed upon disengagement of any one of the clutches.

9. In a machine of the class described, the combination of a work support, a plurality of cutter spindles adjacent thereto, power means for rotating the spindles, a motor for feeding the work support past the spindles, a plurality of clutches each respectively providing a disengageable connection between the power means and one of the spindles, switch means for controlling the feed motor, means whereby the switch means is automatically opened to stop the feed upon disengagement of any one of a plurality of the clutches, and means whereby the opened switch may be closed to operate the feed motor while the clutch is disengaged.

10. In a machine of the class described, the combination of a work support, a plurality of cutter spindles adjacent thereto, a motor for rotating the spindles, a motor for feeding the work support past the spindles, a switch for controlling both motors, a plurality of clutches each respectively providing a disengageable connection between the first motor and certain of the spindles, switch means for controlling the feed motor, and means whereby the said switch means is automatically opened to stop the feed upon disengagement of one of the clutches.

11. In a machine of the class described, the combination of a work support, a plurality of cutter spindles adjacent thereto, a motor for rotating the spindles, a motor for feeding the work support past the spindles, a switch for controlling both motors, a plurality of clutches each respectively providing a disengageable connection between the power means and one of the spindles, a plurality of switches for controlling the feed motor, and means controlled by the movement of each clutch for respectively opening one of the last named switches to stop the feed upon disengagement of one of the clutches.

In testimony whereof, I hereto affix my signature.

WILLARD T. SEARS.